(12) United States Patent
Meng

(10) Patent No.: US 9,578,477 B2
(45) Date of Patent: Feb. 21, 2017

(54) INFORMATION PROCESSING METHOD AND ELECTRONIC DEVICE

(71) Applicant: Lenovo (Beijing) Co., Ltd., Beijing (CN)

(72) Inventor: Zhiming Meng, Beijing (CN)

(73) Assignee: LENOVO (BEIJING) CO., LTD., Haidian District, Beijing (CN)

(*) Notice: Subject to any disclaimer, the term of this patent is extended or adjusted under 35 U.S.C. 154(b) by 0 days.

(21) Appl. No.: 14/871,011

(22) Filed: Sep. 30, 2015

(65) Prior Publication Data

US 2016/0381530 A1    Dec. 29, 2016

(30) Foreign Application Priority Data

Jun. 26, 2015   (CN) .......................... 2015 1 0364519

(51) Int. Cl.
| | | |
|---|---|---|
| *H04W 4/00* | (2009.01) | |
| *H04W 4/14* | (2009.01) | |
| *G06F 17/24* | (2006.01) | |
| *G06T 11/60* | (2006.01) | |

(52) U.S. Cl.
CPC .............. *H04W 4/14* (2013.01); *G06F 17/24* (2013.01); *G06F 17/248* (2013.01); *G06T 11/60* (2013.01)

(58) Field of Classification Search
CPC ......... H04W 4/14; G06F 17/248; G06F 17/24; G06T 11/60

USPC .............. 455/466, 403, 412.1, 414.1, 550.1
See application file for complete search history.

(56) References Cited

U.S. PATENT DOCUMENTS

| | | | |
|---|---|---|---|
| 5,553,277 A | * | 9/1996 | Hirano .............. G06F 17/30277 |
| 7,343,141 B2 | * | 3/2008 | Ellis ......................... H04B 1/20 348/553 |
| 2002/0077135 A1 | * | 6/2002 | Hyon ................. H04M 1/72544 455/466 |
| 2002/0107737 A1 | * | 8/2002 | Kaneko .................. G06Q 30/02 705/14.68 |
| 2006/0264209 A1 | * | 11/2006 | Atkinson ............ G06F 17/3028 455/422.1 |
| 2012/0323664 A1 | * | 12/2012 | Klems .................... G06Q 30/02 705/14.26 |
| 2016/0117885 A1 | * | 4/2016 | Shuster ............... G07F 17/3204 463/17 |

* cited by examiner

*Primary Examiner* — Khai M Nguyen
(74) *Attorney, Agent, or Firm* — Brinks Gilson & Lione; G. Peter Nichols

(57) ABSTRACT

An information processing method and an electronic device are provided to rend key content of a short message in picture and text so that the user may observe the key content of the short message clearly and quickly. The method includes extracting target content from the content of a short message upon receiving the short message, with the target content corresponding to a preset field of the short message and generating and displaying a graphics-text card according to the target content, such that content rendered in the graphics-text card is matched with the content of the short message.

11 Claims, 8 Drawing Sheets

Friend A

2:00 p.m.    entrance of wangfujin shopping mall sender
dating time        dating location
FIG. 6d
** Airline company
95583
Zhengzhou  Beijing
(Xinzheng airport)            (Capital airport)
20:00           21:15
November 1st
Southern Airlines CZ3135
  
FIG.7

✷ ✷ Airline company

95583

Zhengzhou  
(Xinzheng airport)

Beijing  
(Capital airport)

20:00   21:15

November 1st

Southern Airlines CZ3135

Guangzhou  
(Xinbaiyun airport)

Zhengzhou  
(Xinzheng airport)

16:10   18:25

November 4th

Southern Airlines CZ3394

INFORMATION PROCESSING METHOD AND ELECTRONIC DEVICE

This application claims priority to Chinese Patent Application No. 201510364519.2 filed on Jun. 26, 2015, the entire contents of which are incorporated herein by reference.

BACKGROUND

The present disclosure relates to the electronic technology field, and more particularly to an information processing method and an electronic device.

With the development of the science and technology, there are increasingly rich functions in an electronic device, and there are increasingly more setting options and control identifications for controlling various functions. For example, a mobile phone has evolved from having a communication function only, to having functions such as surfing on the net, editing documents, playing games, or the like, and has become one of the indispensable electronic devices of users.

Currently, there are many short messages received at a user's mobile phone, such as a consumption transaction, a booking notification, or the like. In the prior art, the short message is rendered in text. Then, when the user reads a large amount of information, it is difficult for him or her to know the content of the short message quickly, or to see the key content clearly at a first glance.

SUMMARY

An information processing method and an electronic device are provided in embodiments of the present disclosure, which realizes a technical effect of rendering key content of a short message in picture and text, so that the user can observe the key content of the short message clearly and quickly.

In a first aspect, an information processing method is provided in the present disclosure, comprising: extracting target content from content of a short message, upon receiving the short message, the target content corresponding to a preset field of the short message; and generating and displaying a graphics-text card according to the target content, content rendered in the graphics-text card being matched with the content of the short message.

Optionally, the method further comprises: obtaining sender information of the short message before generating and displaying the graphics-text card; determining a preset graphics-text card template corresponding to the short message from at least one graphics-text card template, according to the sender information; wherein, the step of generating the graphics-text card comprising: updating the preset field of the preset graphics-text card template, with the target content.

Optionally, the step of generating the graphics-text card comprising: obtaining sender information of the short message; judging, based on the sender information, whether at least one card comprises a first graphics-text card, wherein the first card is generated according to a historical short message receiving from the sender; and adding the target content into the first graphics-text card according to a preset rule for displaying the historical short message in the first graphics-text card, if the at least one card comprises the first card.

Optionally, the method further comprises: a first application judging whether event information is included in the content rendered by the graphics-text card, after displaying the graphics-text card, the first application being used to generate the graphics-text card according to the short message; the first application generating an event reminder according to the event information in the graphics-text card, if the event information is included in the content rendered by the graphics-text card.

Optionally, the first application generating an event reminder according to the event information in the graphics-text card comprising: the first application determining a priority in relation to the graphics-text card when generating the event reminder, according to a first parameter among multiple parameters of the event information; and generating the event reminder according to the determined priority and the event information of the graphics-text card.

In a second aspect, an electronic device is provided, comprising: a housing; a receiver arranged within the casing and is operative to receive a short message; a processor arranged within the casing, which is connected to the receiver and is operative to extract target content from content of a short message, upon receiving the short message, the target content corresponding to a preset filed of the short message; and to generate a graphics-text card according to the target content; and a display arranged on a surface of the casing, which is connected to the processor and is operative to display the graphics-text card, content rendered in the graphics-text card being matched with the content of the short message.

Optionally, the processor is operative to obtain sender information of the short message before generating and displaying the graphics-text card; to determine a preset graphics-text card template corresponding to the short message from at least one graphics-text card template, according to the sender information; and to update the preset field of the preset graphics-text card template, with the target content.

Optionally, the processor is operative to obtain sender information of the short message; to judge, based on the sender information, whether at least one card comprises a first graphics-text card, wherein the first card is generated according to a historical short message receiving from the sender; and to add the target content into the first graphics-text card according to a preset rule for displaying the historical short message in the first graphics-text card, if the at least one card comprises the first card.

Optionally, the processor is further operative to control a first application to judge whether event information is included in the content rendered by the graphics-text card, after the display displays the graphics-text card, the first application being used to generate the graphics-text card according to the short message; and to control the first application to generate an event reminder according to the event information in the graphics-text card, if the event information is included in the content rendered by the graphics-text card.

Optionally, the processor is operative to control the first application to determine a priority in relation to the graphics-text card when generating the event reminder, according to a first parameter among multiple parameters of the event information; and to generate the event reminder according to the determined priority and the event information of the graphics-text card.

In a third aspect, an electronic device is provided in the present disclosure, comprising: an extraction unit operative to extract target content from content of a short message, upon receiving the short message, the target content corresponding to a preset field of the short message; and a processing and display unit operative to generate and display a graphics-text card according to the target content, content rendered in the graphics-text card being matched with the content of the short message.

Optionally, the processing and display unit is further operative to obtain sender information of the short message before generating and displaying the graphics-text card; to determine a preset graphics-text card template corresponding to the short message from at least one graphics-text card template, according to the sender information; to update the preset field of the preset graphics-text card template, with the target content.

Optionally, the processing and display unit is operative to: obtain sender information of the short message; judge, based on the sender information, whether at least one card comprises a first graphics-text card, wherein the first card is generated according to a historical short message receiving from the sender; and add the target content into the first graphics-text card according to a preset rule for displaying the historical short message in the first graphics-text card, if the at least one card comprises the first card.

Optionally, the electronic device further comprises: an event reminder unit operative to judge whether event information is included in the content rendered by the graphics-text card, after displaying the graphics-text card, and to generate the event reminder by the first application according to the event information in the graphics-text card, when the event information is included in the content rendered by the graphics-text card.

Optionally, the event reminder unit is operative to determine a priority in relation to the graphics-text card when generating the event reminder, according to a first parameter in multiple parameters of the event information; and to generate the event reminder according to the determined priority and the event information of the graphics-text card.

The above one or more technical solutions in embodiments of the present disclosure have at least one or more technical effects as follows.

In the technical solutions of the present disclosure, target content corresponding to a preset field is extracted from content of a short message, according to the preset field, when the short message is received by an electronic device, and a graphics-text card is generated and displayed according to the target content, content rendered in the graphics-text card being matched with the content of the short message. Therefore, when the short message is received by the electronic device in the embodiments of the present disclosure, the message is not rendered to the user in text only so that the user needs to read the message word by word and line by line to get the key content of the short message as in the prior art. Rather, the corresponding target content is extracted from the content of the short message according to the preset field to get the key content of the short message. Then, a graphics-text card corresponding to the content of the short message is generated according to the target content, and the content of the short message is rendered to the user in both picture and text. Therefore, when the user observes the graphics-text card, he or she may observe the target content clearly at a first glance, so as to know the key content of the short message quickly and to save the time spent on reading the short message word by word.

BRIEF DESCRIPTION OF THE DRAWINGS

FIG. 5 is a schematic diagram of a graphics-text card according to an embodiment of the present disclosure;
FIGS. 6a-6d are schematic diagrams of a template of a graphics-text card according to an embodiment of the present disclosure;
FIG. 7 is a schematic diagram of a first graphics-text card according to an embodiment of the present disclosure.

DETAILED DESCRIPTION

An information processing method and an electronic device are provided in embodiments of the present disclosure, which solves the technical problem of the content of the short message being rendered only in text in the prior art, and realize a technical effect of rendering key content of a short message in picture and text, so that the user can observe the key content of the short message clearly and quickly.

In order to solve the above technical problem, the general concept of the technical solution provided in the present disclosure is as follows.

In the technical solutions of the present disclosure, target content corresponding to a preset field is extracted from content of a short message, according to the preset field, when the short message is received by an electronic device, and a graphics-text card is generated and displayed according to the target content, content rendered in the graphics-text card being matched with the content of the short message. Therefore, when the short message is received by the electronic device in the embodiments of the present disclosure, the message is not rendered to the user in text only so that the user needs to read the message word by word and line by line to get the key content of the short message as in the prior art. Rather, the corresponding target content is extracted from the content of the short message according to the preset field to get the key content of the short message. Then, a graphics-text card corresponding to the content of the short message is generated according to the target content, and the content of the short message is rendered to the user in both picture and text. Therefore, when the user observes the graphics-text card, he or she may observe the target content clearly at a first glance, so as to know the key content of the short message quickly and to save the time spent on reading the short message word by word.

Hereinafter, the technical solution of the present disclosure will be described in detail by way of figures and specific embodiments. It is to be understood that the embodiments and the specific features in the embodiments in the present disclosure are used for describing the technical solution in the present disclosure in detail, but not for limiting the technical solution of the present disclosure. The embodiments and the technical features in the embodiments of the present disclosure may be combined with each other without any conflict.

In the specification, the term "and/or" is only used to describe a relationship between related objects, and indicates that there may be three relationships. For example, "A and/or B" may represent a case in which A exists alone, a case in which A and B exist at the same time and a case in which B exists alone. Further, in the specification, the character "/" is generally used to represent that the related objects before and after the character are in a relationship of"or".

Figure 1:
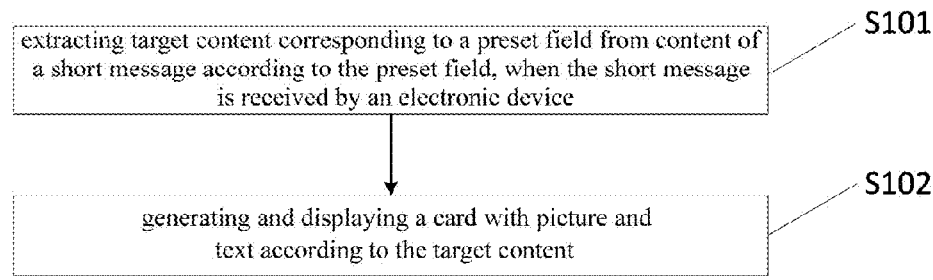
FIG. 1 is a flowchart of an information processing method according to an embodiment of the present disclosure.

In a first aspect of the present disclosure, an information processing method is provided. Referring to FIG. 1, the method comprises the following steps.

In a step S101, target content corresponding to a preset field is extracted from content of a short message according to the preset field, when the short message is received by an electronic device.

In a step S102, a graphics-text card is generated and displayed according to the target content.

Particularly, a SIM (Subscriber Identity Module) card is arranged within the electronic device. A communication device such as a base station, a mobility management entity, or the like, transmits the content of the short message to the electronic device through a SIM card identity. In the step S101, corresponding target content is extracted from content of the short message according to the preset field, when the short message is received by the electronic device.

Particularly, the preset filed is a field set in the electronic device in advance, and represents a focused aspect for the content of the short message by the electronic device. The preset field is, for example, a departure time, a meeting time, a dating time, a location, an airport, a flight number, a train number, a transaction amount, a bank card number, a verification number, a meeting topic, a name, or the like. In particular implementation, the preset field may be set by a manufacture before the electronic device is shipped, and/or may be set in the electronic device by the user according to his/her habit and requirement. Those of ordinary skill in the art to which the present disclosure belongs may choose it according to requirement, and is not limited here.

In the embodiment of the present disclosure, the electronic device calculates the content of the short message according to a preset algorithm, in accordance with the preset field, and then extracts the target content corresponding to the preset filed from the content of the short message. The preset algorithm includes, but is not limited to, any one or more combinations of an Aho-Corasick (AC) automation algorithm, a Support Vector Machine (SVM) algorithm, a regular expression algorithm, a probabilistic context-free grammar method, or the like. Those of ordinary skill in the art to which the present disclosure belongs may choose it according to requirement, and is not limited here.

The preset filed and the extracted target content will be described by four examples listed as follows. In the particular implementation, it is not limited to the following four examples.

In a first example, it is assumed that the received content of the short message is: good afternoon dear customer, thank you for booking Southern Airlines CZ3394, 16:10-18:25, November $4^{th}$, from Guangzhou (Xinbaiyun airport) to Zhengzhou (Xinzheng airport). It is confirmed that the ticket for the passenger Li Dongmei has been charged and the ticket is sold successfully. It is kindly reminded that the check in is stopped 45 minutes before the airplane is taken off. Please take your reservation card to check in. [Southern Airlines].

It is assumed that the preset filed is a meeting time, a dating time, a meeting location, a transaction amount, a bank card number, a transaction time, a meeting topic, a name, a departure location, a destination location, a departure airport, an arriving airport, a departure time, an arriving time, a flight date and a flight number.

The content of the short message is extracted according to the preset field. It is extracted through the process of the preset algorithm that the target content corresponding to the departure location is "Guangzhou", the destination location corresponding to "Zhengzhou", the departure airport corresponding to "Xinbaiyun airport", the arriving airport corresponding to "Xinzheng airport", the departure time corresponding to "16:10", the arriving time corresponding to "18:25", the flight date corresponding to "November $4^{th}$", the flight number corresponding to "Southern Airlines CZ3394", while no target content is extracted according to eight preset fields of the meeting time, the dating time, the train number, the transaction amount, the bank card number, the verification number, the meeting topic and the name. In order to show the preset filed and the corresponding target content in the first example clearly, refer to TABLE 1.

TABLE 1

| | |
|---|---|
| departure location | Guangzhou |
| destination location | Zhengzhou |
| departure airport | Xinbaiyun airport |
| arriving airport | Xinzheng airport |
| departure time | 16:10 |
| arriving time | 18:25 |
| flight date | November $4^{th}$ |
| flight number | Southern AirlinesCZ3394 |
| meeting time | null |
| dating time | null |
| train number | null |
| transaction amount | null |
| bank card number | null |
| verification number | null |
| meeting topic | null |
| name | null |

In a second example, it is assumed that the received content of the short message is: dear colleagues in the research and development section, please go to the first meeting room at 10:00 a.m., June $3^{rd}$, to attend the meeting lectured by a specialist Zhang San, on "how to turn an inventive idea into a product".

It is assumed that the preset filed is a meeting time, a dating time, a meeting location, a transaction amount, a bank card number, a transaction time, a meeting topic, a lecturer name, a departure location, a destination location, a departure airport, an arriving airport, a departure time, an arriving time, a flight date and a flight number.

The content of the short message is extracted according to the preset field. It is extracted through the process of the preset algorithm that the target content corresponding to the meeting time is "June $3^{rd}$, 10:00 a.m.", the meeting location corresponding to "the first meeting room", the meeting topic corresponding to "how to turn an inventive idea into a product", the lecturer corresponding to "Zhang San", while no target content is extracted according to the remaining 12 preset fields. In order to show the preset filed and the corresponding target content in the second example clearly, refer to TABLE 2, in which the 12 preset fields with no target content extracted are not shown.

TABLE 2

| | |
|---|---|
| meeting time | June 3$^{rd}$, 10:00 a.m. |
| meeting location | first meeting room |
| meeting topic | how to turn an inventive idea into a product |
| lecturer | Zhang San |

In a third example, it is assumed that the received content of the short message is: 1694.00 RMB is paid from your account with card number 111111111111111 at 12:00 p.m., July 1$^{st}$, and your balance is 0.62.

It is assumed that the preset filed is a meeting time, a dating time, a meeting location, a transaction amount, a bank card number, a transaction time, a balance, a name, a departure location, a destination location, a departure airport, an arriving airport, a departure time, an arriving time, a flight date and a flight number.

The content of the short message is extracted according to the preset field. It is extracted through the process of the preset algorithm that the target content corresponding to the transaction amount is "1694.00", the bank card number corresponding to "111111111111111", the transaction time corresponding to "July 1$^{st}$, 12:00 p.m.", the balance corresponding to "0.62", while no target content is extracted according to the remaining 12 preset fields. In order to show the preset filed and the corresponding target content in the third example clearly, refer to TABLE 3, in which the 12 preset fields with no target content extracted are not shown.

TABLE 3

| | |
|---|---|
| transaction amount | 1694.00 |
| bank card number | 111111111111111 |
| transaction time | July 1$^{st}$, 12:00 p.m. |
| balance | 0.62 |

In a fourth example, it is assumed that the received content of the short message is: I've had my meal. I will meet you at the entrance of Wangfujin shopping mall at 2:00 p.m.

It is assumed that the preset filed is a meeting time, a dating time, a meeting location, a transaction amount, a bank card number, a transaction time, a dating location, a name, a departure location, a destination location, a departure airport, an arriving airport, a departure time, an arriving time, a flight date and a flight number.

The content of the short message is extracted according to the preset field. It is extracted through the process of the preset algorithm that the target content corresponding to the dating time is "2:00 p.m." and the dating location corresponding to "entrance of Wangfujin shopping mall", while no target content is extracted according to the remaining 14 preset fields. In order to show the preset filed and the corresponding target content in the fourth example clearly, refer to TABLE 4, in which the 14 preset fields with no target content extracted are not shown.

TABLE 4

| | |
|---|---|
| meeting time | 2:00 p.m. |
| meeting location | entrance of Wangfujin shopping mall |

After the target content is extracted, next, in the step S102, the graphics-text card is generated and displayed according to the target content, and the content of the short message is rendered to the user clearly by the graphics-text card. For example, assuming that the short message in the first example is rendered by the graphics-text card shown in FIG. 2. After the user observes the graphics-text card in FIG. 2, firstly, he/she may determine quickly that it is a short message about flight notification, by the airport, the flight number, the airline company, the plane icon, or the like. Further, the key content such as the department time, the department airport, the flight number, or the like, of the flight may be known clearly, according to the target content rendered in the graphics-text card. Therefore, the user may know the key content of the short message quickly and clearly by observing the graphics-text card shown in FIG. 2, and does not need to read the flight notification short message word by word, so that the time is saved and the user experience is improved.

Particularly, in the embodiment of the present disclosure, there are many ways to generate the graphics-text card, two of which will be described in detail in the following. In the specific implementation, there may be other ways than the following two ways.

In a first way, the method further comprises obtaining sender information of the short message before generating and displaying the graphics-text card; determining a preset graphics-text card template corresponding to the short message from at least one graphics-text card template, according to the sender information; wherein, the step of generating the graphics-text card comprising: updating content to be updated which corresponds to the preset field in the preset graphics-text card template, with the target content.

Particularly, since the short message transmitted by an official party, such as a bank, a website, or the like is relatively important in the normal life, and the normal notification short messages may be divided into several types, at least one graphics-text card template may be arranged in advance in the electronic device, each of which is arranged with the content to be updated, of the preset filed focused in this template. The corresponding relationship between the graphics-text card template and the transmitter may be set by the electronic device by default, and/or may be set by the user, which is not limited here.

Figures 5, 6A:
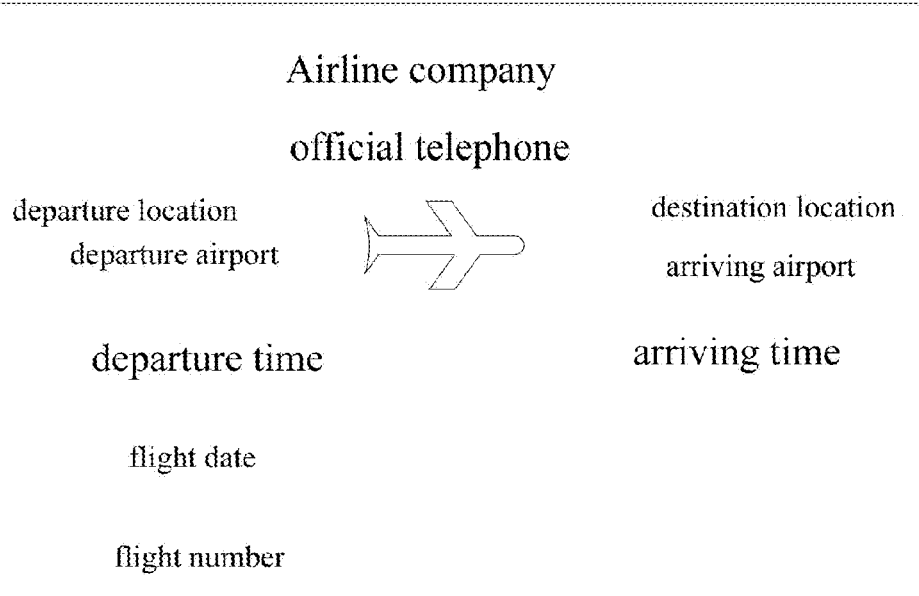

For example, the flight notification short message is often transmitted by an airline company, a tour website, or the like, then the template shown in FIG. 6a may be associated with an official number of the airline company and an official number of the tour website, or the like. The transaction notification short message is often transmitted by a bank, then a target shown in FIG. 6c may be set in advance, and all the official bank numbers are associated with the template shown in FIG. 6c. The user may associate the contact "Li Si" with the template shown in FIG. 6b. The other examples will not be listed here.

Therefore, before the step S102, the sender information of the short message is firstly obtained. In the embodiment of the present disclosure, the sender information includes, but is not limited to, a sender number, a sender name, a sender identification, or the like. Then, the graphics-text card template corresponding to the sender information is looked up from at least one graphics-text card template, according to the sender information, and the graphics-text card template corresponding to the sender information is determined as the preset graphics-text card template.

For example, the sender information in the first example is an incoming number 95583 which is an official number of an airline company. It is determined that the graphics-text card template shown in FIG. 6a corresponds to 95583 by looking up from the at least one graphics-text card template, and then the graphics-text card template shown in FIG. 6a is the preset graphics-text card template.

In the second example, the sender information is the sender name "Li Si". The user has associated the contact"Li Si" with the graphics-text card template shown in FIG. 6b. Therefore, the preset graphics-text card template corresponding to the short message in the second example will be determined as the template shown in FIG. 6b, according to the name of the sender "Li Si".

The sender information in the third example is the sender identification "** bank". It is determined that the graphics-text card template shown in FIG. 6c corresponds to the bank by looking up from the at least one graphics-text card template, and then the graphics-text card template shown in FIG. 6c is the preset graphics-text card template.

The sender information in the fourth example is the sender identification "friend A". It is determined that the graphics-text card template shown in FIG. 6d corresponds to the friend A by looking up from the at least one graphics-text card template, and then the graphics-text card template shown in FIG. 6d is the preset graphics-text card template.

After the preset graphics-text card template is determined, in the step S102, the content to be updated which corresponds to the preset field in the preset graphics-text card is updated with the target content, to generate the graphics-text card.

For example, the content to be updated in the preset field "departure airport" in FIG. 6a is the text"departure airport" in FIG. 6a, which is updated with the corresponding target content "Xinbaiyun airport", then, the text "departure airport" in the preset graphics-text card template is replaced with "Xinbaiyun airport". Similarly, the content to be updated in the individual preset fields is updated according to the target content corresponding to the preset field in TABLE 1, to get the final graphics-text card shown in FIG. 2.

Figure 3:
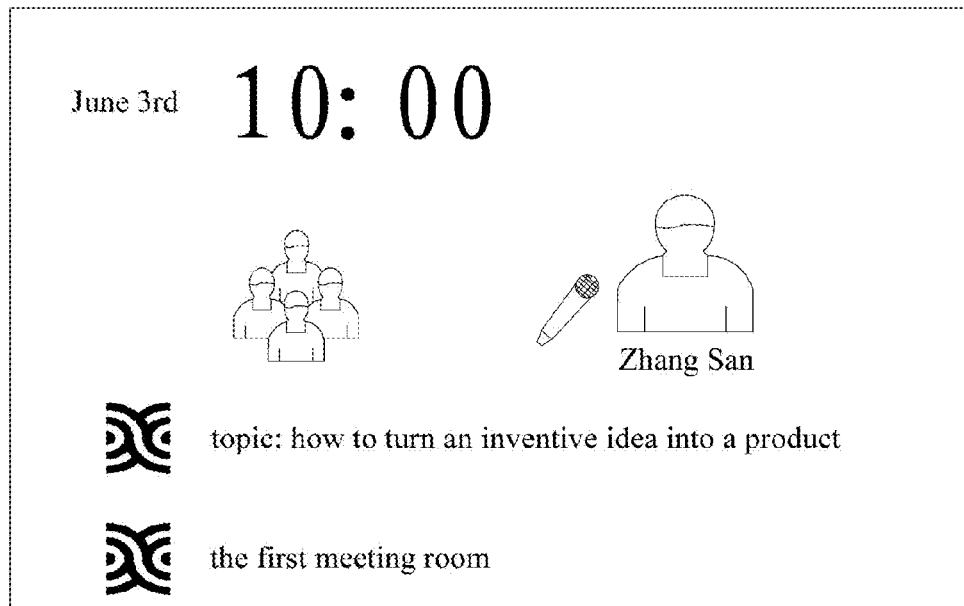
FIG. 3 is a schematic diagram of a graphics-text card according to an embodiment of the present disclosure.
Figure 4:
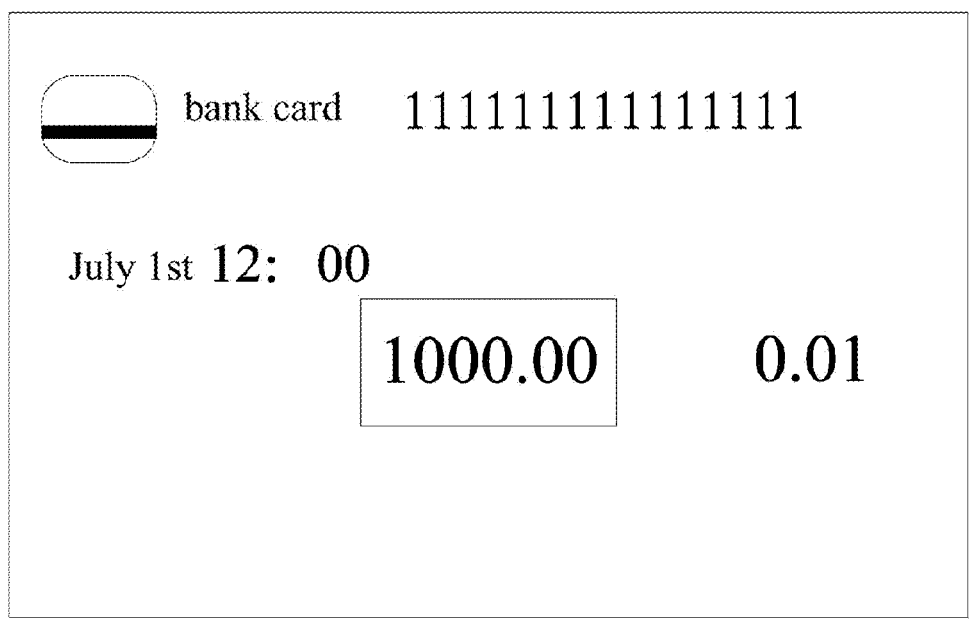
FIG. 4 is a schematic diagram of a graphics-text card according to an embodiment of the present disclosure.
Figure 6B:
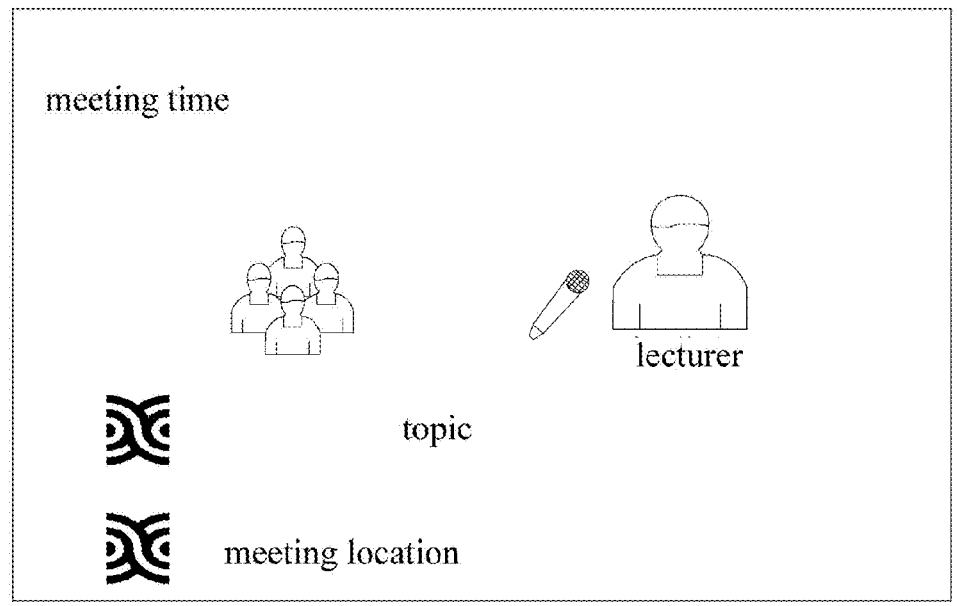
Figure 6C:
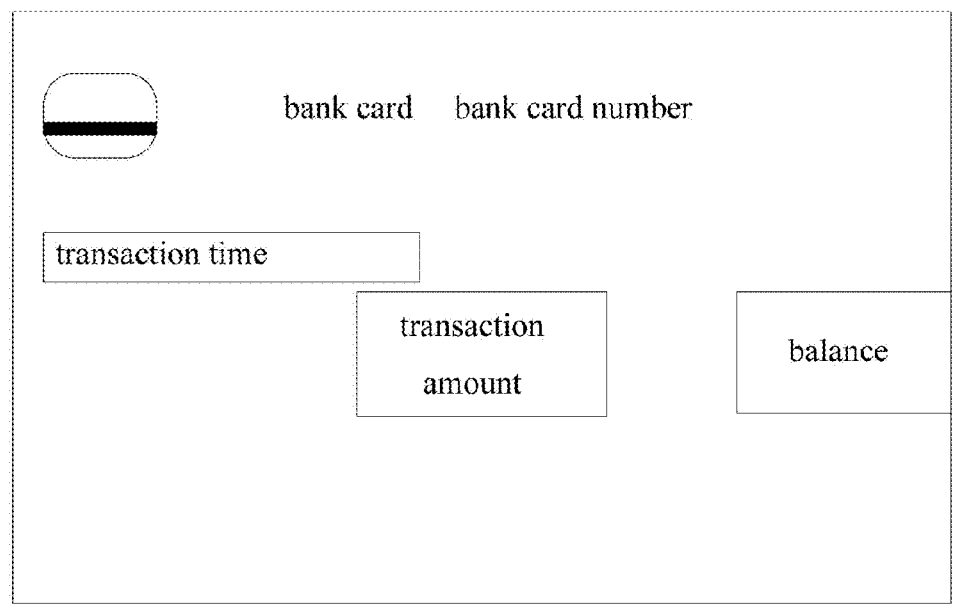

Similarly, the content to be updated in the preset field in FIG. 6b is updated with the target content in TABLE 2, to generate the graphics-text card shown in FIG. 3. The content to be updated in the preset field in FIG. 6c is updated with the target content in TABLE 3, to generate the graphics-text card shown in FIG. 4. The content to be updated in the preset field in FIG. 6d is updated with the target content in TABLE 4, to generate the graphics-text card shown in FIG. 5.

In a second way, the step of generating the graphics-text card comprising: obtaining sender information of the short message; judging whether there is a first graphics-text card generated according to a historical short message sent from the sender of the short message before the current timing, in at least one existing graphics-text card, based on the sender information; and adding the target content into the first graphics-text card according to a preset rule for displaying the historical short message in the first graphics-text card, when there is the first graphics-text card in the at least one existing graphics-text card.

When a same sender transmits the short messages to the SIM card arranged in the electronic device multiple times, in order for the user to browse the key content of the historical short messages and the key content of the current short message conveniently, in the embodiment of the present disclosure, the short messages from the same sender may be displayed in the same graphics-text card when the graphics-text card is generated.

Particularly, in order to display the short messages from the same sender in the same graphics-text card, firstly, it needs to get the sender information. Then, it is looked up in the at least one existing graphics-text card based on the sender information. It is checked whether the sender information of each existing graphics-text card is matched with the sender information of the current short message. If the sender information of an existing graphics-text card is matched with the sender information of the current short message, the existing graphics-text card is taken as the first graphics-text card which is generated based on the historical short messages sent by the same sender, that is, the sender of the current short message, before the current timing.

Still referring to the above example, the sender information in the first example is the sender number 95583. It is checked that the sender information of one of the existing graphics-text card is the sender information " airline company" with an official number of 95583.Then, the sender information of the current short message is matched with the sender information of the existing graphics-text card, and then the exiting graphics-text card is taken as the first graphics-text card. The sender information in the third example is the sender identification "bank". The sender information of one of the exiting graphics-text card is the sender name "** bank" which is the same as the sender information of the current graphics-text card. Then, the exiting graphics-text card is taken as the first graphics-text card. The other examples will not be described one by one.

Next, if there is the first graphics-text card in at least one exiting graphics-text card, the target content is added into the first graphics-text card according to the preset rule for displaying the historical short message in the first graphics-text card, and then the graphics-text card, the content of which is matched with the content of the short message, is generated.

Particularly, in the embodiment of the present disclosure, there are many kinds of preset rules. For example, according to the time when the historical short message is received, the historical short message with the earliest time may be displayed first, the historical short message with the latest time may be displayed last; or the historical short message with the earliest time may be displayed last, the historical short message with the latest time may be displayed first; or the historical short messages are displayed in table, or the historical short messages are represented in a particular pattern, or the like. Those of ordinary skill in the art to which the present disclosure belongs may choose it according to requirement, and is not limited here.

The electronic device adds the target content of the short message at the specified location for adding in the first graphics-text card according to the preset rule, to generate the graphics-text card.

Figure 8:
FIG. 8 is a schematic diagram of a graphics-text card generated by adding target content to the first graphics-text card shown in FIG. 7 according to an embodiment of the present disclosure
Figure 8:
Figure 8:
Figure 8:
Figure 8:
Figure 8:
Figure 8:
Figure 8:

Referring to the first and the third examples described above, assume that the electronic device has generated the first graphics-text card according to the historical short message sent by the sender 95583 before the current timing, as shown in FIG. 7. The preset rule is that the short messages are displayed in an order of sending time, and each short message is displayed according to the pattern of the first piece of short message. Then, according to the preset rule, the electronic device adds the target content in the first example into the first graphics-text card to generate the graphics-text card as shown in FIG. 8.

Therefore, when the user observes the graphics-text card displayed in the electronic device, he or she can not only know the flight to be taken clearly, but also see his or her historical flight records or see all his/her flight records in a near future. Then, the user does not need to read the short message word by word to know the flight plan, and do not need to browse multiple pieces of short messages to check the recent flight plans, and can see his/her recent flight plan from the graphics-text card clearly at a first glance.

Figure 9:
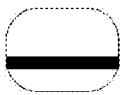
'
FIG. 9 is another schematic diagram of a graphics-text card generated by adding the target content to the first graphics-text card according to an embodiment of the present disclosure

Similarly, for the short message in the third example, the electronic device adds the short message into the first graphics-text card to generate the graphics-text card shown in FIG. 9, so that the user can browse his consumption records in one graphics-text card.

Optionally, in the embodiment of the present disclosure, the method may further comprise the following steps after the step S102.

The first application judges whether there is event information included in the content rendered by the graphics-text card, the first application being used to generate the graphics-text card according to the short message.

The first application gives an event reminder according to the event information in the graphics-text card, when the event information is included in the content rendered by the graphics-text card.

Particularly, the first application is an application installed in the electronic device, which may read the short message to generate the graphics-text card according to the short message. Further, the first application is further used to judge whether the content rendered by the graphics-text card includes the event information. In the embodiment of the present disclosure, the event information represents things that may be done by the user at a timing after the current timing. The time information includes information such as the time, the location, the event content, the participant, or the like, which is not limited here.

In order to remind the user automatically, the first application needs to determine whether the graphics-text card includes the event information. Particularly, the first application determines whether there is at least one future time in the content rendered by the graphics-text card. For example, if the current timing is 00:00, Jan. 1, 2015, then any timing after that is the future time. If the target content in the graphics-text card includes a future timing, the content rendered by the graphics-text card indicates that the user needs to do something in the future, then it is determined that the graphics-text card includes the event information.

Then, the first application acquires at least the time and the event content from the target content of the graphics-text card, and gives an event reminder at a matched timing. The matched timing is, for example, a day before the timing when the event is to be done, the timing just when the event is being done, or an hour before the timing when the event is to be done, which is not limited here.

Figure 2:
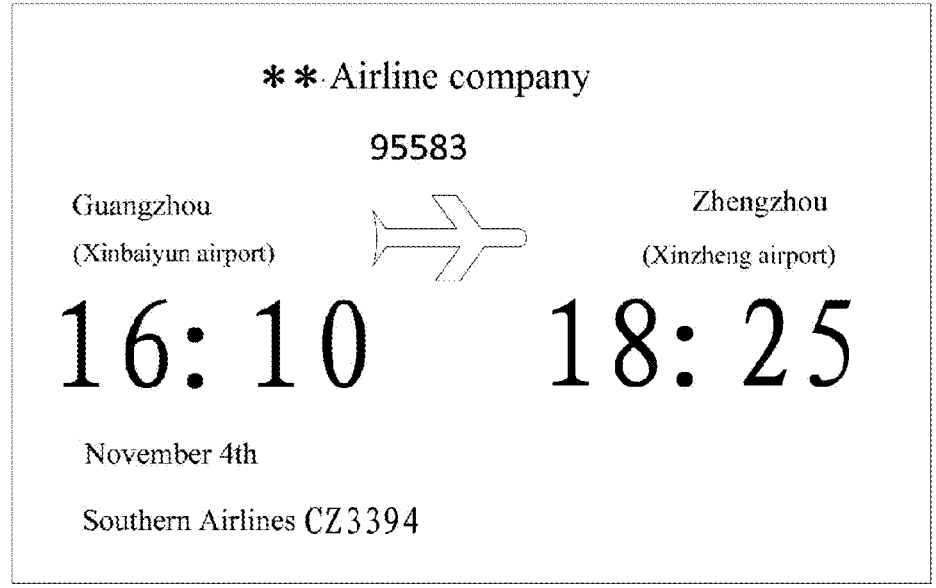
FIG. 2 is a schematic diagram of a graphics-text card according to an embodiment of the present disclosure.

For example, in the graphics-text card shown in FIG. 2, the time acquired by the first application is 16:10 p.m., November $4^{th}$, the acquired location is Xinbaiyun airport, and the acquired event is Southern Airlines CZ3394 flight. Assuming that the event is to be reminded at 16:10 p.m., November $3^{rd}$, the reminder may be a graphics-text card for view by the user, or may be a text such as "you will take the flight CZ3394 by Southern Airlines at 16:10 p.m. from Xinbaiyun airport, please prepare for it.", or the like, which is not limited here.

It can be known from the above description that, the first application in the electronic device may remind the user of the event automatically when the short message includes the event information. Therefore, even if the user forgets to set the event reminder, the first application can still remind the user intelligently, so that the user experience is improved.

Optionally, when there are multiple cards with figure and text including the event information, and multiple event reminders are to be done, the step of the first application giving an event reminder according to the event information in the graphics-text card comprising: the first application determining a priority of the graphics-text card when giving the event reminder, according to a first parameter in multiple parameters of the event information; and giving the event reminder according to the priority and the event information of the graphics-text card.

Particularly, the multiple parameters of the event information include, but are not limited to, the time, the location, the sender information, or the like. The first parameter may be set by default by the electronic device, or may be chosen by the user. For example, if the user hopes to be reminded of the event in a time order, the first parameter is set to be the time.

The first application determines the priorities of the event information according to the first parameter. Particularly, the multiple event information which needs to be reminded of are ranked according to the first parameter, so as to determine the priority of each event information. For example, the event information is ranked in an event occurrence time order, in a location order, in a sender importance order set by the user. The user is reminded of an event with a higher priority first, and then an event with a lower priority.

For example, assume that the event information in FIGS. 2 and 3 is to be reminded, and the first parameter is the occurrence time. The event information time in FIG. 3 is earlier than that in FIG. 2, and the event in FIG. 3 is reminded earlier, and the event in FIG. 2 is reminded later.

Figure 10:
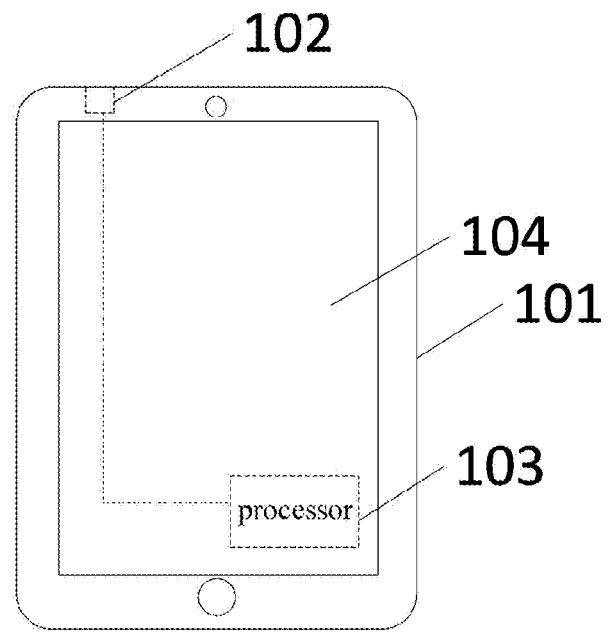
'
FIG. 10 is a schematic diagram of a structure of an electronic device according to an embodiment of the present disclosure.

In a second aspect of the present disclosure, an electronic device is provided, as shown in FIG. 10, comprising: a casing 101 for protecting the electronic device; a receiver 102 arranged within the casing 101 and is operative to receive a short message; a processor 103 arranged within the casing 101, which is connected to the receiver 102 and is operative to extract target content corresponding to a preset field from content of a short message, according to the preset field, when the short message is received by the receiver 102; and to generate a graphics-text card according to the target content; and a display 104 arranged on a surface of the casing 101, which is connected to the processor 103 and is operative to display the graphics-text card, as shown in FIGS. 2-5. Content rendered in the graphics-text card is matched with the content of the short message Particularly, in the embodiment of the present disclosure, the processor 103 can generate the graphics-text card in both ways, and the steps performed by the processor 103 and the functions realized by the processor 103 may include the following processes.

In a first way, the processor 103 is further operative to obtain sender information of the short message before generating and displaying the graphics-text card; to determine a preset graphics-text card template corresponding to the short message from at least one graphics-text card template, according to the sender information; and to update content to be updated which corresponds to the preset field in the preset graphics-text card template, with the target content.

In a second way, the processor 103 is further operative to obtain sender information of the short message; to judge whether there is a first graphics-text card generated according to a historical short message sent from the sender of the short message before the current timing, in at least one existing graphics-text card, based on the sender information; and to add the target content into the first graphics-text card according to a preset rule for displaying the historical short message in the first graphics-text card, when there is the first graphics-text card in the at least one existing graphics-text card.

The particular implementations of generating the graphics-text card in both ways have been described in detail, and are not described here repeatedly.

Further, in order to remind the user automatically, the processor 103 is further operative to control a first application to judge whether there is event information included in the content rendered by the graphics-text card, after the display 104 displays the graphics-text card, the first application being used to generate the graphics-text card according to the short message; and to control the first application to give an event reminder according to the event information in the graphics-text card, when the event information is included in the content rendered by the graphics-text card.

Particularly, in the embodiment of the present disclosure, the processor 103 is operative to control the first application to determine a priority of the graphics-text card when giving the event reminder, according to a first parameter in multiple parameters of the event information; and to give the event reminder according to the priority and the event information of the graphics-text card.

The particular implementations of performing the event reminder have been described in detail in the above embodiments, and are not described here repeatedly.

Particularly, the processor 103 may be a general Central Processing Unit (CPU), may be an Application Specific Integrated Circuit (ASIC), or may be one or more integrated circuit(s) for controlling an application to be performed.

Further, the electronic device may include one or more memory (memories). The memory may include a Read Only Memory (ROM), a Random Access Memory (RAM) and a disk memory.

The various variations and specific examples in the information processing method in the embodiments described with reference to FIGS. 1-9 may also be applied to the electronic device described in the present embodiment. Those skilled in the art may understand the method for implementing the electronic device of the present disclosure clearly by the detailed description of the information processing method as described above, and will not be described here repeatedly.

Figure 11:
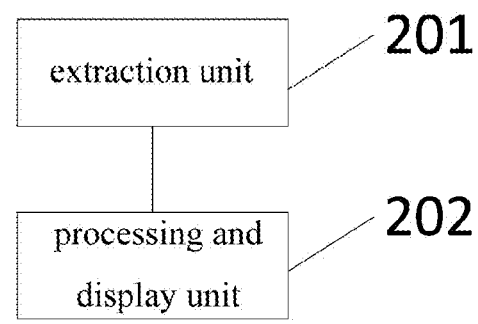
FIG. 11 is a schematic diagram of a structure of another electronic device according to an embodiment of the present disclosure.

Based on the same inventive concept as that in the information processing method in the above embodiments of the present disclosure, in a third aspect of the present disclosure, an electronic device is provided, as shown in FIG. 11, comprising: an extraction unit 201 operative to extract target content corresponding to a preset field from content of a short message, according to the preset field, when the short message is received by an electronic device; and a processing and display unit 202 operative to generate and display a graphics-text card according to the target content, content rendered in the graphics-text card being matched with the content of the short message.

Optionally, the processing and display unit 202 is further operative to obtain sender information of the short message before generating and displaying the graphics-text card; determine a preset graphics-text card template corresponding to the short message from at least one graphics-text card template, according to the sender information; content to be updated is updated corresponding to the preset field in the preset graphics-text card template.

Alternatively, the processing and display unit 202 is operative to: obtain sender information of the short message; judge whether there is a first graphics-text card generated according to a historical short message sent from the sender of the short message before the current timing, in at least one existing graphics-text card, based on the sender information; and add the target content into the first graphics-text card according to a preset rule for displaying the historical short message in the first graphics-text card, when there is the first graphics-text card in the at least one existing graphics-text card.

Further, in the embodiment of the present disclosure, the electronic device further comprises: an event reminder unit operative to judge whether there is event information included in the content rendered by the graphics-text card, after displaying the graphics-text card, and to give the event reminder according to the event information in the graphics-text card, when the event information is included in the content rendered by the graphics-text card.

Particularly, the event reminder unit is operative to determine a priority of the graphics-text card when giving the event reminder, according to a first parameter in multiple parameters of the event information; and give the event reminder according to the priority and the event information of the graphics-text card.

The various variations and specific examples in the information processing method in the embodiments described with reference to FIGS. 1-9 may also be applied to the electronic device described in the present embodiment. Those skilled in the art may understand the method for implementing the electronic device of the present disclosure clearly by the detailed description of the information processing method as described above, and will not be described here repeatedly.

The above one or more technical solutions in embodiments of the present disclosure have at least one or more technical effects as follows.

In the technical solutions of the present disclosure, target content corresponding to a preset field is extracted from content of a short message, according to the preset field, when the short message is received by an electronic device, and a graphics-text card is generated and displayed according to the target content, content rendered in the graphics-text card being matched with the content of the short message. Therefore, when the short message is received by the electronic device in the embodiments of the present disclosure, the message is not rendered to the user in text only so that the user needs to read the message word by word and line by line to get the key content of the short message as in the prior art. Rather, the corresponding target content is extracted from the content of the short message according to the preset field to get the key content of the short message. Then, a graphics-text card corresponding to the content of the short message is generated according to the target content, and the content of the short message is rendered to the user in a way of picture and text. Therefore, when the user observes the graphics-text card, he or she may observe the target content clearly at a first glance, so as to know the key content of the short message quickly and to save the time spent on reading the short message word by word.

Those skilled in the art shall understand that the embodiments of the present disclosure may be provided as methods, systems, or computer program product. Therefore, the present disclosure may be in a way of an entire hardware embodiment, an entire software embodiment, or an embodiment combining software and hardware aspects. Also, the present disclosure may be a computer application product implemented on a computer usable storage medium, including, but not limited to, a disk memory, a CD-ROM, an optical memory, or the like, embodied with computer usable program code.

The disclosure is described with reference to flowchart illustrations and/or block diagrams of methods, apparatus and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Particularly, the computer program instructions corresponding to the two information processing methods in the embodiments of the present disclosure may be stored on a storage medium such as an optical disk, a hard disk, a USB disk, or the like. When the computer program instructions corresponding to the first information processing method in the storage medium is read or performed by an electronic device, the following steps are performed.

Target content corresponding to a preset field is extracted from content of a short message, according to the preset field, when the short message is received by an electronic device; and a graphics-text card is generated and displayed according to the target content, content rendered in the graphics-text card being matched with the content of the short message.

Optionally, the storage medium also stores some other computer instructions, which, when executed, performs the following steps.

Sender information of the short message is obtained before generating and displaying the graphics-text card; a preset graphics-text card template corresponding to the short message is determined from at least one graphics-text card template, according to the sender information.

wherein, the computer instructions corresponding to the step of generating the graphics-text card, stored in the storage medium, when executed, comprises: updating content to be updated which corresponds to the preset field in the preset graphics-text card template, with the target content.

Optionally, the computer instructions corresponding to the step of generating the graphics-text card, stored in the storage medium, when executed, comprises: obtaining sender information of the short message; judging whether there is a first graphics-text card generated according to a historical short message sent from the sender of the short message before the current timing, in at least one existing graphics-text card, based on the sender information; and adding the target content into the first graphics-text card according to a preset rule for displaying the historical short message in the first graphics-text card, when there is the first graphics-text card in the at least one existing graphics-text card.

Optionally, the storage medium also stores some other computer instructions, which, when executed, performs the following steps.

A first application judges whether there is event information included in the content rendered by the graphics-text card, after displaying the graphics-text card, the first application being used to generate the graphics-text card according to the short message; the first application gives an event reminder according to the event information in the graphics-text card, when the event information is included in the content rendered by the graphics-text card.

Optionally, the computer instructions corresponding to the step of the first application giving an event reminder according to the event information in the graphics-text card, stored in the storage medium, comprises: the first application determining a priority of the graphics-text card when giving the event reminder, according to a first parameter in multiple parameters of the event information; and giving the event reminder according to the priority and the event information of the graphics-text card.

Obviously, those skilled in the art may make various modifications and variations to the present disclosure without departing from the spirit and scope of the present disclosure. In this way, it is intended to incorporate these modifications and variations as long as they are within the scope of the claims and its equivalents.

The invention claimed is:

1. An information processing method applied to an electronic device with a processor configured to perform the information processing method, comprising:
    extracting target content from content of a short message upon receiving the short message, the target content corresponding to a preset field of the short message; and
    generating and displaying a graphics-text card according to the target content, wherein content rendered in the graphics-text card is matched with the content of the short message.

2. The method of claim 1, further comprising:
    obtaining sender information of the short message before generating and displaying the graphics-text card;
    determining a preset graphics-text card template corresponding to the short message from at least one graphics-text card template according to the sender information;
    wherein the step of generating the graphics-text card comprises updating the preset field of the preset graphics-text card template with the target content.

3. The method of claim 1, wherein the step of generating the graphics-text card comprises:
    obtaining sender information of the short message;
    judging, based on the sender information, whether at least one card comprises a first graphics-text card, wherein the first card is generated according to a historical short message received from the sender; and
    adding the target content into the first graphics-text card according to a preset rule for displaying the historical short message in the first graphics-text card, if the at least one card comprises the first card.

4. The method of claim 2, further comprising:
    a first application judging whether event information is included in the content rendered by the graphics-text card, after displaying the graphics-text card, the first application being used to generate the graphics-text card according to the short message; and the first application generating an event reminder according to the event information in the graphics-text card, if the event information is included in the content rendered by the graphics-text card.

5. The method of claim 4, wherein, the first application generating an event reminder according to the event information in the graphics-text card comprises:

the first application determining a priority in relation to the graphics-text card when generating the event reminder according to a first parameter among multiple parameters of the event information; and generating the event reminder according to the determined priority and the event information of the graphics-text card.

6. An electronic device, comprising:

a housing;

a receiver operative to receive a short message;

a processor connected to the receiver and operative to extract target content from content of the short message upon receiving the short message, the target content corresponding to a preset field of the short message; and to generate a graphics-text card according to the target content; and a display arranged on a surface of the housing, connected to the processor, and operative to display the graphics-text card, wherein content rendered in the graphics-text card is matched with the content of the short message.

7. The electronic device of claim 6, wherein the processor is operative to obtain sender information of the short message before generating and displaying the graphics-text card to determine a preset graphics-text card template corresponding to the short message from at least one graphics-text card template, according to the sender information; and to update the preset field of the preset graphics-text card template with the target content.

8. The electronic device of claim 6, wherein the processor is operative to obtain sender information of the short message; to judge, based on the sender information, whether at least one card template comprises a first graphics-text card, wherein the first card is generated according to a historical short message receiving from the sender; and to add the target content into the first graphics-text card according to a preset rule for displaying the historical short message in the first graphics-text card, if the at least one card comprises the first card.

9. The electronic device of claim 7, wherein the processor is further operative to control a first application to judge whether event information is included in the content rendered by the graphics-text card, after the display displays the graphics-text card, the first application being used to generate the graphics-text card according to the short message; and to control the first application to generate an event reminder according to the event information in the graphics-text card, if the event information is included in the content rendered by the graphics-text card.

10. The electronic device of claim 9, wherein the processor is operative to control the first application to determine a priority in relation to the graphics-text card when generating the event reminder, according to a first parameter among multiple parameters of the event information; and to generate the event reminder according to the determined priority and the event information of the graphics-text card.

11. A non-transitory computer readable storage medium having stored therein computer program instructions which, when being executed by a processor of an electronic device, performs the method of claim 1.

\* \* \* \* \*